US008538099B2

(12) United States Patent
Fessler et al.

(10) Patent No.: US 8,538,099 B2
(45) Date of Patent: Sep. 17, 2013

(54) METHOD AND SYSTEM FOR CONTROLLING IMAGE RECONSTRUCTION

(75) Inventors: Jeffrey Allen Fessler, Ann Arbor, MI (US); Jiang Hsieh, Brookfield, WI (US)

(73) Assignees: General Electric Company, Schenectady, NY (US); The Regents of the University of Michigan, Ann Arbor, MI (US)

( * ) Notice: Subject to any disclaimer, the term of this patent is extended or adjusted under 35 U.S.C. 154(b) by 1742 days.

(21) Appl. No.: 11/087,264

(22) Filed: Mar. 23, 2005

(65) Prior Publication Data

US 2006/0215891 A1 Sep. 28, 2006

(51) Int. Cl.
*G06K 9/00* (2006.01)

(52) U.S. Cl.
USPC ........................................................ 382/128

(58) Field of Classification Search
USPC .......... 382/130, 131, 132, 261–266, 270–275
See application file for complete search history.

(56) References Cited

U.S. PATENT DOCUMENTS

| | | | |
|---|---|---|---|
| 5,416,815 A | 5/1995 | Hsieh | |
| 5,424,783 A * | 6/1995 | Wong | 348/606 |
| 5,627,918 A * | 5/1997 | Carasso | 382/254 |
| 5,774,521 A * | 6/1998 | Close et al. | 378/62 |
| 5,909,476 A | 6/1999 | Cheng et al. | |
| 6,101,236 A | 8/2000 | Wang et al. | |
| 6,324,240 B1 | 11/2001 | Yan et al. | |
| 6,448,771 B1 * | 9/2002 | Harvey et al. | 324/307 |
| 6,486,671 B1 * | 11/2002 | King | 324/307 |
| 6,493,416 B1 | 12/2002 | Hsieh | |
| 6,507,633 B1 | 1/2003 | Elbakri et al. | |
| 6,697,508 B2 | 2/2004 | Nelson | |
| 6,697,660 B1 * | 2/2004 | Robinson | 600/409 |
| 6,721,387 B1 | 4/2004 | Naidu et al. | |
| 6,757,442 B1 | 6/2004 | Avinash | |
| 6,973,156 B2 * | 12/2005 | Sokolov | 378/4 |
| 6,985,613 B2 | 1/2006 | Ogino | |
| 7,187,794 B2 * | 3/2007 | Liang et al. | 382/131 |
| 7,206,440 B2 * | 4/2007 | August | 382/131 |
| 7,251,306 B2 * | 7/2007 | Sauer et al. | 378/4 |
| 7,308,071 B2 * | 12/2007 | Bouman et al. | 378/4 |
| 7,403,005 B2 * | 7/2008 | Katscher et al. | 324/309 |
| 2002/0094114 A1 * | 7/2002 | Ogino | 382/128 |
| 2003/0190066 A1 * | 10/2003 | Boas et al. | 382/131 |
| 2005/0078862 A1 * | 4/2005 | Guillemaud et al. | 382/132 |
| 2006/0104409 A1 * | 5/2006 | Bouman et al. | 378/4 |
| 2008/0310695 A1 * | 12/2008 | Garnier et al. | 382/131 |

OTHER PUBLICATIONS

Galatsanos, N.; Katsaggelos, A., Methods for Choosing the Regularization Parameter and Estimating the Noise Variance in Image Restoration and Their Relation, Jul. 1992, IEEE Transactions on Image Processing, vol. 1, No. 3, pp. 322-336.*

(Continued)

*Primary Examiner* — Vikkram Bali
(74) *Attorney, Agent, or Firm* — Ziolkowski Patent Solutions Group, SC

(57) ABSTRACT

A method and system for controlling image reconstruction in an imaging system are provided. The method includes receiving scan data from an imaging system, and determining regularization parameters for a plurality of portions of an image for reconstructing the image based on the received scan data, wherein the regularization parameters vary for the plurality of portions of the image.

22 Claims, 6 Drawing Sheets

(56) References Cited

OTHER PUBLICATIONS

Sauer, K.; Bouman, C., A Local Update Strategy for Iterative Reconstruction from Projections, Feb. 1993, IEEE Transactions on Signal Processing, vol. 41, No. 2, pp. 534-548.*

Fessler, J.; Roger, W., Spatial Resolution Properties of Penalized-Likelihood Image Reconstruction: Space-Invariant Tomographs, Sep. 1996, IEEE Transactions on Image Processing, vol. 5, No. 9, pp. 1346-1358.*

Stayman, J; Fessler, J, Regularization for Uniform Spatial Resolution Properties in Penalized-Likelihood Image Reconstruction, Jun. 2000, IEEE Transactions on Medical Imaging, vol. 19, No. 6, pp. 601-615.*

Park, S.C.; Kang, M.G., Noise-adaptive edge-preserving image restoration algorithm, Dec. 2000, SPIE, Opt. Eng., vol. 39, Issue 12, pp. 3124-3137.*

Palmer, A.; Razaz, M.; Mandic, D., Spatially Adaptive Image Restoration by Neural Network Filtering, Nov. 2002, IEEE, Proceedings of the VII Brazilian Symponsium on Neural Networks, pp. 184-189.*

Rivera, M.; Marroquin, J., Efficient half-quadratic regularization with granularity control, 2003, Image and Vision Computing 21, pp. 345-357.*

Wu, X.; Wang, R.; Wang, C., Regularized Image Restoration Based on Adaptively Selecting Parameter and Operator, Aug. 2004, Proceedings of the 17th International Conference on Pattern Recognition, vol. 3, pp. 662-665.*

P.J.Huber, "Robust Estimation of a Location Parameter", Annals of Mathematical Statistics, Mar. 1964, vol. 35, No. 1, pp. 73-101.

J.A.Fessler, "Mean and Variance of Implicitly Defined Biased Estimators (Such as Penalized Maximum Likelihood): Applications to Tomography", IEEE Transactions on Image Processing, Mar. 1996, vol. 5, No. 3, pp. 493-506.

J.A.Fessler, "Analytical Approach to Regularization Design for Isotropic Spatial Resolution", Proceedings of IEEE Nuclear Science Symposium and Medical Imaging Conference, 2003, pp. 2022-2026.

J.W.Stayman and J.A.Fessler, "Compensation for Nonuniform Resolution Using Penalized-Likelihood Reconstruction in Space-Variant Imaging Systems", IEEE Transactions on Medical Imaging, Mar. 2004, vol. 23, No. 3, pp. 269-284.

A.H.Delaney and Y.Bresler, "Globally Convergent Edge-Preserving Regularized Reconstruction: An Application to Limited-Angle Tomography", IEEE Transactions on Image Processing, Feb. 1998, vol. 7, No. 2, pp. 204-221.

Jeon, W., et al., Image Restoration using Dual Adaptive Regularization Operators. In Proc. IEEE Intl. Conf., on Pattern Recognition, vol. 3, 4 pages, 2000.

Perry, S.W., et al., Weight Assignment for Adaptive Image Restoration by Neural Networks. IEEE Trans on Neural Networks, vol. 11, 15 pages, Jan. 2000.

Perry, S., et al., Adaptive Image Processing—A Computational Intelligence Perspective. CRC, ISBN 0-8493-0283-8, 6 pages, 2002.

You, Y-L., et al., Ringing Reduction in Image Restoration by Orientation-Selective Regularization. IEEE Signal Proc. Letters, vol. 3, 3 pages, Feb. 1996.

Reeves, S.J., Optimal Space-Varying Regularization in Iterative Image Restoration. IEEE Trans. Im. Proc., vol. 3, 6 pages, May 1994.

* cited by examiner

METHOD AND SYSTEM FOR CONTROLLING IMAGE RECONSTRUCTION

BACKGROUND OF THE INVENTION

This invention relates generally to imaging systems, and more particularly, to controlling image reconstruction in imaging systems.

Imaging systems typically acquire scan data using a scanning operation and then reconstruct the image using the acquired scan data. Further, imaging systems perform image reconstruction using various methods, such as, for example, statistical methods. One such statistical method for image reconstruction includes the selection of a cost function $\eta(x)$. The method further may include the application of a suitable iterative algorithm to determine a minimizer $\hat{x}$ of the cost function $\eta(x)$. The minimizer $\hat{x}$ is a reconstructed image and may be defined by the following equation:

$$\hat{x} = \arg\min \eta(x), \qquad (1)$$

where x is an image and is represented mathematically as $x=(x_1, x_2, \ldots x_M)$ and M is the number of unknown pixel values (or voxel values in 3D).

Image reconstruction involves recovering an unknown function f(r) from the acquired scan data, where r denotes spatial position in 2D or 3D coordinates. Typically, a discretized version of f(r) is reconstructed. Often f(r) is represented using a finite-series expansion as follows:

$$f(r) = \sum_{j=1}^{M} x_j b_j(r), \qquad (2)$$

where $b_j(r)$ denotes spatial basis functions and each $x_j$ denotes an unknown coefficient. More generally, the function and bases can depend on time as well:

$$f(r, t) = \sum_{j=1}^{M} x_j b_j(r, t) \qquad (3)$$

Therefore, determining f(r) simplifies to determining the coefficients, x. The spatial basis functions, b(r), may be selected to be, for example, rectangular functions, in which case, the coefficients x are called pixel or voxel values. Hereinafter, the term pixel values refers to any such set of coefficients, x, regardless of the choice of basis functions, b.

The cost function $\eta(x)$ may be defined to include the following two terms:

$$\eta(x) = L(x) + R(x) \qquad (4)$$

The first term L(x) is typically referred to as the 'data fit' term, and is a measure of how well the image x fits the acquired scan data according to the physics, geometry, and statistics of the acquired scan data. The second term R(x) is typically referred to as the 'regularization term' or 'roughness penalty'. R(x) controls noise, and without R(x), the minimum value $\hat{x}$ becomes noticeably noisy.

Known methods typically use a regularization term that is a quadratic function of the differences between neighboring pixel values. The quadratic regularization term may cause blurring of edges, and loss of details (e.g., lower resolution) in the reconstructed image $\hat{x}$ as a result of the value of the quadratic function rising rapidly. This blurring or loss of detail results from the large differences between neighboring pixel values. For example, there are large differences in pixel values for neighboring pixels that cross the boundaries between different anatomical regions and it is desirable to preserve the edges and other fine details in such a case, as well as reduce noise in the smoother image regions.

Known methods also may use another regularization term as follows:

$$R(x) = \beta \sum_{j=1}^{M} \sum_{k \in N_j} \Psi(x_j - x_k) \qquad (5)$$

where $\Psi$ is a potential function and is non-quadratic. Regularization terms of this form are referred to as edge-preserving regularization terms. Potential function $\Psi$ may be computed, for example, using a Huber function or a hyperbola function as follows:

$$\Psi(t) = \sqrt{(1 + (t/\delta)^2)} \qquad (6)$$

The edge preserving potential functions rise less rapidly than the quadratic function, and hence better image quality is provided when compared to a regularization term having a quadratic function. The user selectable regularization parameter $\delta$ also controls the image contrast above which edges are preserved. However, these known methods use a single value of $\delta$ throughout the image, which can reduce image resolution and increase image noise, thereby reducing image quality.

BRIEF DESCRIPTION OF THE INVENTION

In an exemplary embodiment, a method for controlling image reconstruction in an imaging system is provided. The method includes receiving scan data from an imaging system and determining regularization parameters for each of a plurality of portions of an image for use in reconstructing the image based on the received scan data. The regularization parameters vary for the plurality of portions of the image.

In another exemplary embodiment, an imaging system is provided. The imaging system includes a data acquisition portion and a processing portion. The data acquisition portion is configured to acquire scan data and the processing portion is configured to determine regularization parameters for each of a plurality of portions of an image for reconstructing the image based on the acquired scan data. The regularization parameters vary for the plurality of portions of the image.

DETAILED DESCRIPTION OF THE INVENTION

Various embodiments of the invention provide methods and systems for controlling image reconstruction. For example, the various embodiments may be used in medical imaging systems or non-destructive industrial imaging systems (e.g., luggage scanner). The medical imaging system may be any type including, for example, a computed tomography (CT) scanner, a positron emission tomography (PET) scanner, and a magnetic resonance imaging (MRI) scanner, among others. The various embodiments control image reconstruction to, for example, reduce noise, blurring of edges, and loss of details in images.

Figure 1:
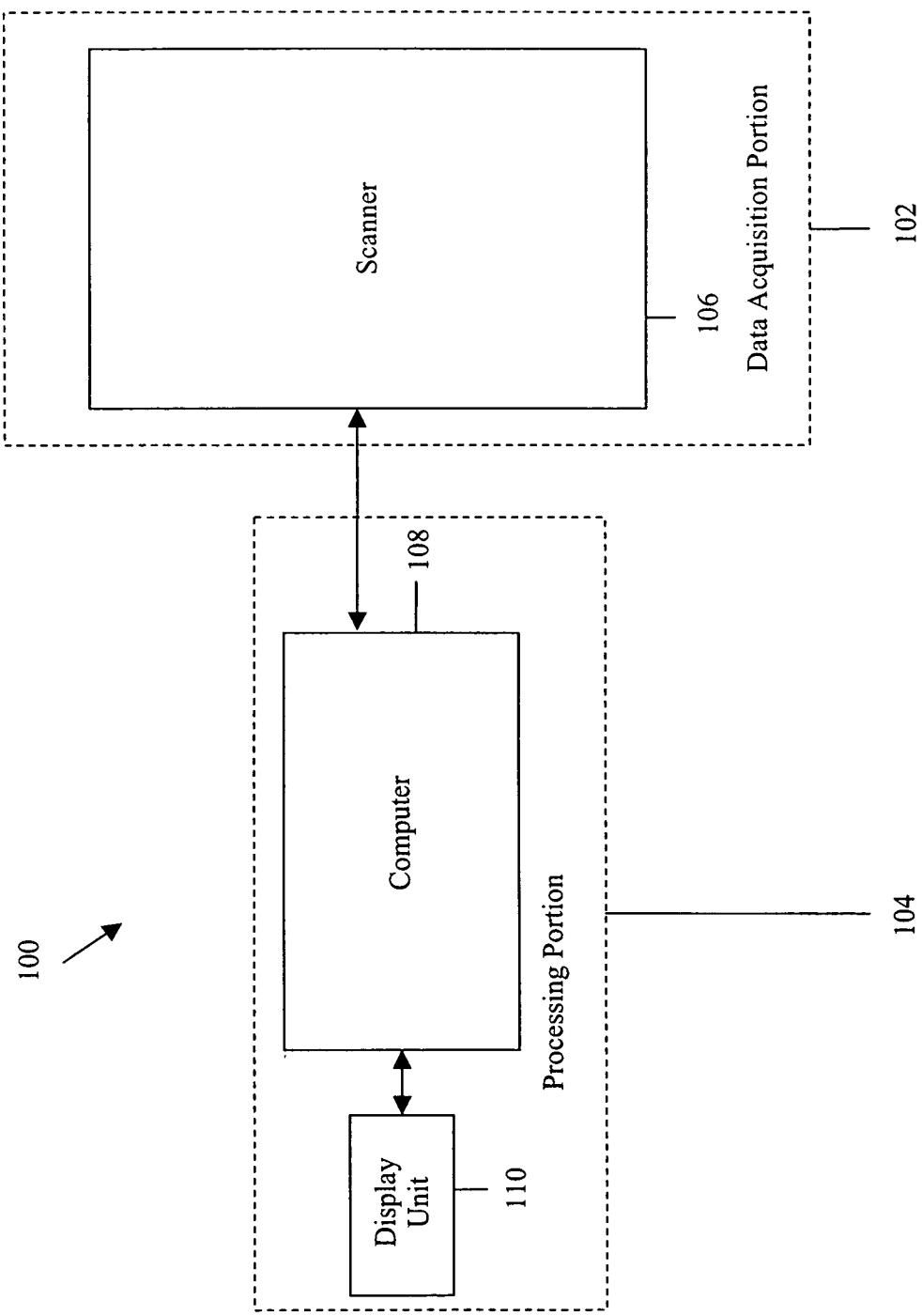
FIG. 1 is a block diagram of a medical imaging system in accordance with an exemplary embodiment of the invention.

FIG. 1 is a block diagram of a medical imaging system 100 in accordance with an exemplary embodiment of the invention and in connection with which the various methods described herein may be implemented. In an exemplary embodiment of the invention, medical imaging system 100 may be an X-ray CT scanner. Medical imaging system 100 generally includes a data acquisition portion 102 and a processing portion 104. Data acquisition portion 102 acquires scan data, for example, by scanning a patient as is known. Acquired scan data is then provided to processing portion 104. Processing portion 104 processes the scan data to generate a final image for display. Processing portion 104 is configured to perform various embodiments of the methods discussed hereinafter and may include, as is known, the processing typically performed to acquire and reconstruct an image. Specifically, and as described in more detail herein, processing portion 104 is configured to determine regularization parameters for each of a plurality of portions of an image for use in reconstructing the image based on the acquired scan data. In the various embodiments, the regularization parameters vary for the plurality of portions of the image. The regularization parameters are represented by a difference value, for example, by delta ($\delta$). Each $\delta$ is computed, for example, based on at least one of a scan protocol, noise prediction, preliminary reconstruction and user input. Various methods of determining $\delta$ are described in detail in connection with FIGS. 3-5.

More particularly, data acquisition portion 102 includes a scanner 106, for example, a CT scanner or a MRI scanner as is known. Processing portion 104 includes a processor, such as, for example, a computer 108. Computer 108 is coupled to a display unit 110. In an exemplary embodiment of the invention, computer 108 performs the various embodiments described herein to determine (e.g., calculate) the regularization parameters. Display unit 110 is configured to display generated images to users. In an exemplary embodiment of the invention, users may provide inputs or feedback to processing portion 104 based on the images displayed by display unit 110, which may control further operations or processing. It should be noted that the data acquisition portion 102 and processing portion 104 may include other components as desired or needed, for example, based on the application or type of scanning system. For example, one or more controllers may be provided to control the movement of the scanner 106 or a part thereof (e.g., a detector portion) in any known manner.

Figure 2:
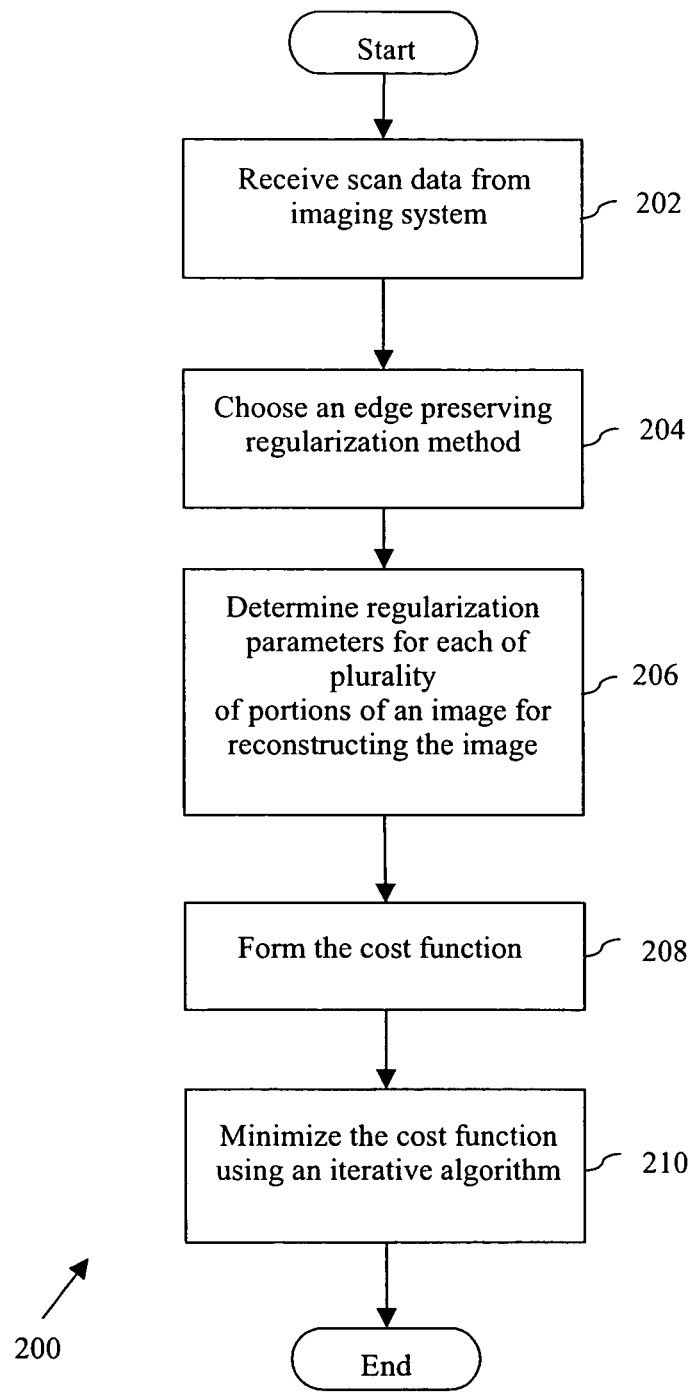
FIG. 2 is a flowchart of a method for controlling image reconstruction in a medical imaging system in accordance with an exemplary embodiment of the invention.

FIG. 2 is a flowchart of a method 200 for controlling image reconstruction in a medical imaging system in accordance with an exemplary embodiment of the invention. Specifically, at 202, scan data is received from a scan (e.g., CT, PET or MRI scan) using medical imaging system 100. At 204, an edge preserving regularization method is selected. In an exemplary embodiment of the invention, this selection includes using a form of the edge preserving regularization equation and method as follows:

$$R(x) = \beta \sum_{j=1}^{M} \sum_{k \in N_j} \Psi_{jk}(x_j - x_k) \quad (7)$$

$$\text{where } \Psi_{jk}(t) = w_{jk}\sqrt{(1 + (t/\delta_{jk})^2)} \quad (8)$$

$\Psi_{jk}$ is a potential function, $\beta$ is a selectable global parameter, $N_j$ is a set of indices of elements adjacent to or within a predetermined distance of the jth pixel (e.g., adjacent pixels) of an image, also referred to as neighbors or neighboring elements, and M is the number of unknown pixel values (or voxel values in 3D). The neighbors may be horizontal neighbors, vertical neighbors, diagonal neighbors, or pairs of pixels that are not immediately adjacent to each other. Neighboring pixels can be extended to three dimensions and dynamic imaging.

Potential function $\Psi_{jk}$ may be different for every pair of neighboring pixels of an image. In an exemplary embodiment, the same form of potential function $\Psi$ is used for every pair of pixels. However, a different value of $\delta_{jk}$ may be used for every pair of pixels. The weight $w_{jk}$ also may be different for different pairs of pixels.

In another embodiment of the invention, a form of $\Psi_{jk}$ as follows is used:

$$\Psi_{jk}(t) = w_{jk}|t|^{p_{jk}} \quad (9)$$

where the exponent $p_{jk}$ is space varying.

In yet another embodiment of the invention, a form of the edge preserving regularization method as follows is used:

$$R(x) = \beta \sum_{k} \Psi_k([Cx]_k) \quad (10)$$

where the matrix C contains coefficients that are used for forming desired linear combinations.

The regularization method as shown in Equation (10) uses linear combinations of sets of pixels. For example, if the kth row of C has a single '1', a single '−1', and the rest of the elements are zero, then $[Cx]_k$ is equal to $x_j - x_k$. It should be noted that other edge preserving regularization methods may be used as desired or needed, and as are known.

At 206, regularization parameters for each of a plurality of portions of an image are determined for reconstructing the image based on the received scan data. In an embodiment of the invention, the regularization parameters are determined for each of a plurality of pixels in an image to be reconstructed, wherein the regularization parameters, e.g., $\delta_{jk}$, differ for at least two of the pixels. In another embodiment of the invention, the regularization parameters are determined for each of a plurality of groups of pixels in an image to be reconstructed, wherein the regularization parameters differ for at least two of the groups of pixels. In still another embodiment of the invention, the regularization parameters are determined based on scan data received from adjacent portions of the image (e.g., two different adjacent portions of the image or neighboring image slices in a 3D imaging study).

The regularization parameters are varying in at least one of space and time. Exemplary methods of determining the regularization parameters are explained in more detail in connection with FIGS. 3-5.

At 208, a cost function η(x) is formed as is known. The cost function η(x) includes two terms as follows:

$$\eta(x) = L(x) + R(x) \tag{11}$$

The first term, L(x), is referred to as the 'data fit' term. L(x) is a measure of how well the image x fits the measured data according to the physics, geometry, and statistics of the measured data. The second term, R(x), is referred to as 'regularization term' or 'roughness penalty'.

In an exemplary embodiment of the invention, L(x) is computed using a negative likelihood corresponding to a statistical model for the measurements of the geometry and physics of the scan subject. In another exemplary embodiment of the invention, L(x) is computed using a squared error function. Other methods may be implemented as desired or needed.

At 210, the cost function η(x) is minimized using a known iterative process or algorithm. The minimum value of the cost function defines the reconstructed image. The regularization parameter used in the cost function is varying in at least one of space and time. The image reconstruction may be a two-dimensional, three-dimensional, or four-dimensional image reconstruction, or higher, if other dimensions such as cardiac or respiratory phase are considered.

Figure 3:
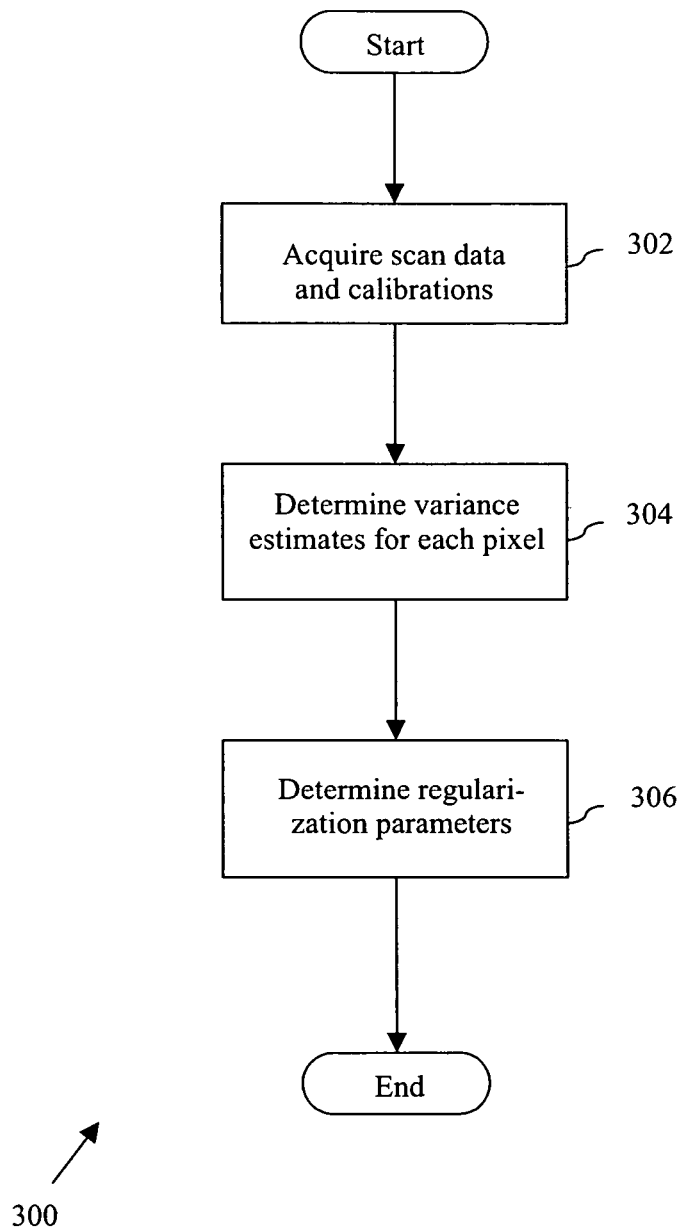
FIG. 3 is a flowchart of a method for determining regularization parameters in accordance with an exemplary embodiment of the invention.

FIG. 3 is a flowchart of a method 300 for determining regularization parameters in accordance with an embodiment of the invention. Method 300 determines regularization parameters by using predictions of local image noise standard deviations.

At 302, scan data and calibration information is acquired as is known. For example, in an X-ray CT imaging system, the scan data may include sinogram data or projection data, and the calibration data may include factors such as X-ray source intensity fluctuations from a reference channel. As another example, in MRI, scan data may include k-space data and calibration data may include a measured field map. At 304, variance estimates are determined for each pixel as is known. At 306, regularization parameters are determined based on the variance estimates. An approximate covariance of a reconstructed image $\hat{x}$, as shown in Equation (1), is defined by the following equation:

$$Cov\{\hat{x}\} \approx [\nabla^2 \eta]^{-1} Cov\{\nabla \eta\} [\nabla^2 \eta(x)]^{-1} \tag{12}$$

where ∇η is the gradient of the cost function as shown in Equation (11), and ∇²η is the Hessian of the cost function as shown in Equation (11). The above equation is used to compute diagonal elements of the covariance matrix. The diagonal elements of the covariance matrix are variance estimates $\sigma_j^2$ for each pixel. The parameter $\delta_{jk}$ is selected such that $\delta_{jk}$ is small when $\sigma_j$ and $\sigma_k$ are small, and $\delta_{jk}$ is large when $\sigma_j$ and $\sigma_k$ are large. In an exemplary embodiment of the invention, the following form of $\delta_{jk}$ is used:

$$\delta_{jk} = 3\sqrt{\sigma_j \sigma_k} \tag{13}$$

In an exemplary embodiment of the invention, the terms shown in Equation (12) are computed by using local Fourier approximations and/or Fast Fourier Transforms. The Hessian term as shown in Equation (12) is of the following form:

$$\nabla^2 \eta = A' diag\{v_i\} A, \tag{14}$$

where 'A' denotes the "system matrix" of the imaging system, for example, the lengths of intersections between each ray and each pixel in CT, or the Fourier-like "encoding matrix" in MRI. In the above equation, $v_i$ is determined based on measurement statistics. For example, in X-ray CT imaging systems, these factors may include sinogram data. The term Cov{∇η} in Equation (12) is of the same form as in Equation (14), but with different $v_i$ values.

Using local Fourier approximations and Fast Fourier Transforms, the variance of the jth pixel value can be approximated using the following equation:

$$\sigma_j^2 \approx \int_0^{2\pi} \int_0^{\infty} \frac{w_1^j(\phi)/|\rho|}{|w_0^j(\phi)/|\rho| + R(\rho, \phi)|^2} |\rho| d\rho d\phi, \tag{15}$$

where ρ and φ are variables in polar coordinates. $w^j(\phi)$ is an angular-dependent weighting function that depends on the $v_i$s associated with, for example, the X-rays in a CT system that intersect the jth pixel. Specifically, $w_1^j(\phi)$ is associated with Cov{∇η}, $w_0^j(\phi)$ is associated with the Hessian, and R(ρ,φ) is the local frequency response of the regularization term. The above variance approximation accounts for the differing statistics of all the rays that traverse the jth pixel.

The local Fourier approximation may be used to determine $W_{jk}$ factors. The local frequency response of the reconstructed image $\hat{x}$ is approximately equal to L(ρ,φ), where L(ρ,φ) is defined by the following equation:

$$L(\rho, \phi) = \frac{w_1^j(\phi)/|\rho|}{w_0^j(\phi)/|\rho| + R(\rho, \phi)} \tag{16}$$

By adjusting $w_{jk}$, R(ρ,φ) can be changed, and thereby the local frequency response, L(ρ,φ), can be matched to a desired shape.

Figure 4:
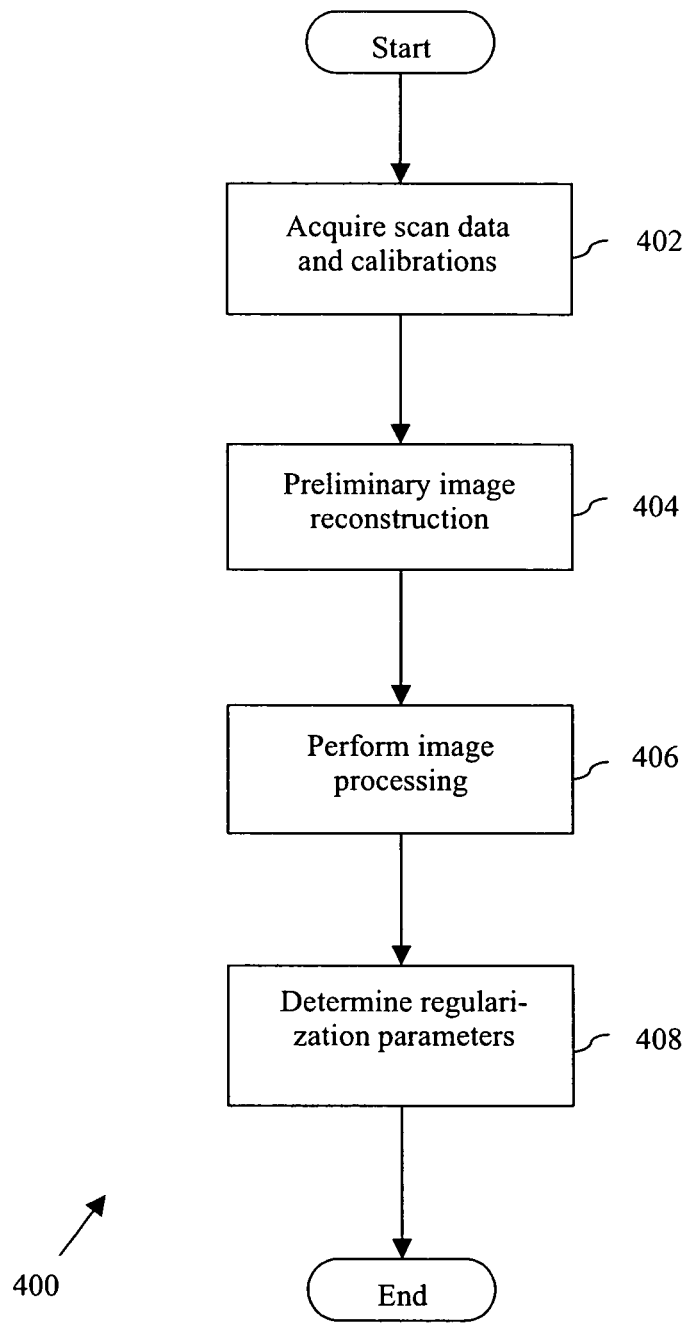
FIG. 4 is a flowchart of a method for determining regularization parameters in accordance with another exemplary embodiment of the invention.

FIG. 4 is a flowchart of another method 400 for determining regularization parameters in accordance with an embodiment of the invention. At 402, scan data and calibration information is acquired as is known and as described herein. At 404, a preliminary image reconstruction is performed, for example, by a conventional filtered backprojection (FBP) method or by a simple iterative method. At 406, image processing as is known is performed. Image processing includes, for example, image segmentation and edge detection. At 408, regularization parameters are determined based on the results of image processing. For example, the regularization parameters may be selected to preserve edges at locations where the presence of an edge is detected or to preserve the boundaries between regions identified by a segmentation method.

Figure 5:
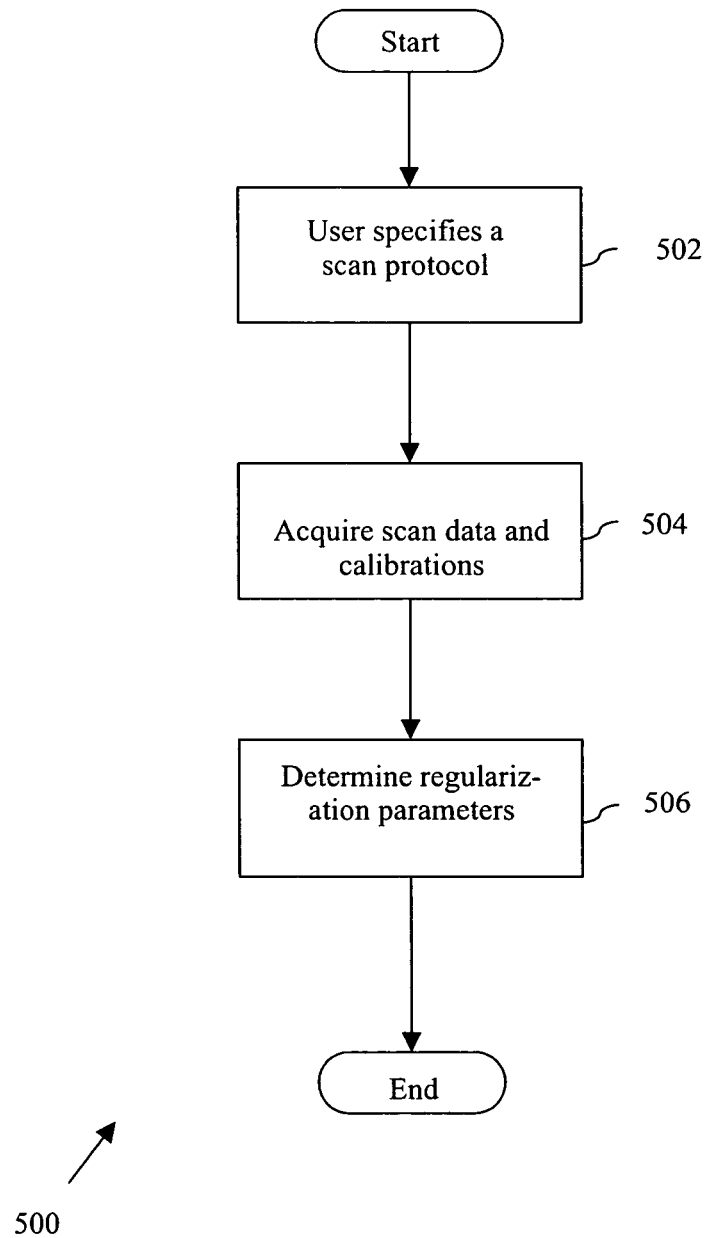
FIG. 5 is a flowchart of a method for determining regularization parameters in accordance with another exemplary embodiment of the invention.

FIG. 5 is a flowchart of another method 500 for determining regularization parameters in accordance with an embodiment of the invention. At 502, a user specifies a scan protocol, for example, a brain scan or a cardiac scan via a user input on a scanner. At 504 scan data and calibration information are acquired, as is known, according to the user specified scan protocol. At 506, regularization parameters are determined according to the scan protocol. For example, in brain scans it may be desirable to preserve very subtle differences in pixel values, so the regularization parameters may be set to smaller values.

Figure 6:
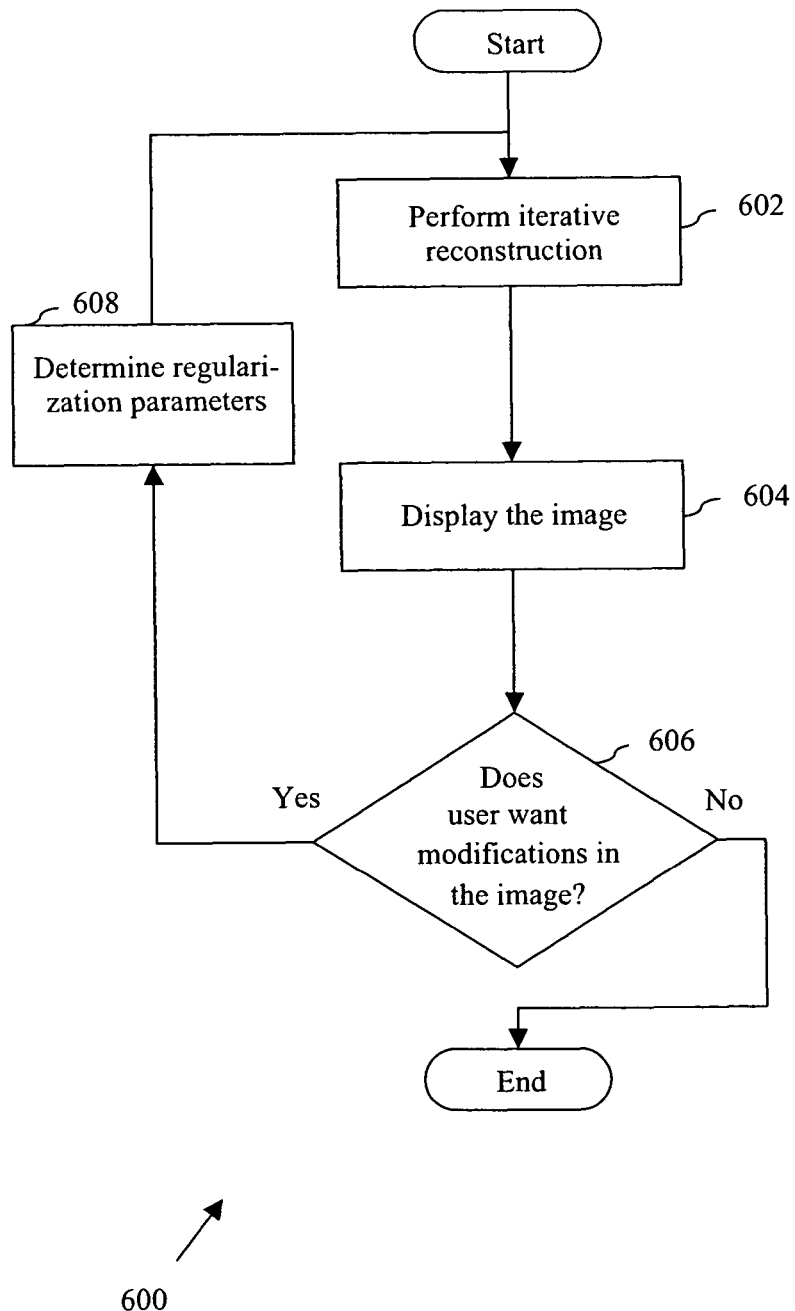
FIG. 6 is a flowchart of a method for determining regularization parameters in accordance with another exemplary embodiment of the invention.

FIG. 6 is a flowchart of another method 600 for determining regularization parameters in accordance with an embodiment of the invention. At 602, iterative reconstruction, as is known, is performed to form an image. At 604, an image is displayed, for example, on a display. At 606, the user is queried about desired or required modification to the image. If the user desires or requires some modifications to the image, then at 608, regularization parameters are determined according to the user inputs. For example, if the user wants more edge detail in a certain image region, the user could identify that region using, for example, an interactive graphical system, and then the regularization parameters in that specific region could be set to smaller values. If the user does not want any modification in the image, the image is displayed as a final image.

Various embodiments of the invention provide methods that control noise in iteratively reconstructed images, for example, medical images. The various embodiments also reduce or avoid loss of spatial resolution and blurring of edges that accompany the process of noise control. Moreover, the various embodiments may result in reduced patient dose as better image quality is provided with the use of the same amount of image data as is used in conventional imaging systems.

A technical effect of various embodiments is to control noise in iteratively reconstructed medical images. Another technical effect of various embodiments of the invention is to reduce or avoid loss of spatial resolution and blurring of edges in iteratively reconstructed medical images. Still another technical effect of various embodiments of the invention is to reduce patient dose in medical imaging.

The various embodiments or components, for example, processing portion 104, may be implemented as part of a computer system, which may be separate from or integrated with an imaging system. The computer system may include a computer, an input device, a display unit and an interface, for example, for accessing the Internet. The computer may include a microprocessor. The microprocessor may be connected to a communication bus. The computer may also include a memory. The memory may include Random Access Memory (RAM) and Read Only Memory (ROM). The computer system further may include a storage device, which may be a hard disk drive or a removable storage drive such as a floppy disk drive, optical disk drive, and the like. The storage device may also be other similar means for loading computer programs or other instructions into the computer system.

As used herein, the term "computer" may include any processor-based or microprocessor-based system including systems using microcontrollers, reduced instruction set circuits (RISC), application specific integrated circuits (ASICs), logic circuits, and any other circuit or processor capable of executing the functions described herein. The above examples are exemplary only, and are thus not intended to limit in any way the definition and/or meaning of the term "computer".

The computer system executes a set of instructions that are stored in one or more storage elements, in order to process input data. The storage elements may also store data or other information as desired or needed. The storage element may be in the form of an information source or a physical memory element within the processing machine.

The set of instructions may include various commands that instruct the computer as a processing machine to perform specific operations such as the processes of the various embodiments of the invention. The set of instructions may be in the form of a software program. The software may be in various forms such as system software or application software. Further, the software may be in the form of a collection of separate programs, a program module within a larger program or a portion of a program module. The software also may include modular programming in the form of object-oriented programming. The processing of input data by the processing machine may be in response to user commands, or in response to results of previous processing, or in response to a request made by another processing machine.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

While the invention has been described in terms of various specific embodiments, those skilled in the art will recognize that the invention can be practiced with modification within the spirit and scope of the claims.

What is claimed is:

1. A method for controlling image reconstruction in an imaging system, said method comprising:
   receiving scan data; and
   determining, based on the received scan data, at least one of regularization parameters and potential functions for a plurality of portions of an image to be reconstructed, wherein the at least one of regularization parameters and potential functions vary for the plurality of portions of the image to be reconstructed;
   wherein the at least one of regularization parameters and potential functions is determined from the received scan data prior to any image reconstruction of the received scan data being performed.

2. A method in accordance with claim 1 wherein the imaging system is one of a medical imaging system and a non-destructive industrial imaging system.

3. A method in accordance with claim 2 wherein the medical imaging system is at least one of a computed tomography system, a positron emission tomography system, a single photon emission computed tomography system, an x-ray tomosynthesis system, and a magnetic resonance imaging system.

4. A method in accordance with claim 1 further comprising determining the at least one of regularization parameters and potential functions based on scan data corresponding to adjacent portions of the image.

5. A method in accordance with claim 1 further comprising determining the at least one of regularization parameters and potential functions based on scan data corresponding to neighboring image slices.

6. A method in accordance with claim 1 wherein the at least one of regularization parameters and potential functions include difference values, said method further comprising determining the difference values for an edge preserving regularization method for minimizing an image cost function for an iterative image reconstruction process.

7. A method in accordance with claim 6 wherein the potential functions include at least one of regularization parameters that control an overall strength of each of the plurality of portions and regularization parameters that control a degree of edge-preservation of each of the plurality of portions.

8. A method in accordance with claim 1 wherein the scan data includes scan data indicative of a plurality of images to be combined to generate a final image, said method further comprising determining the at least one of regularization parameters and potential functions for each image of the plurality of images, the at least one of regularization parameters and potential functions being different for at least two images of the plurality of images.

9. A method in accordance with claim 1 wherein the at least one of regularization parameters and potential functions vary in at least one of space and time.

10. A method in accordance with claim 1 wherein determining the at least one of regularization parameters and potential functions comprises:
predicting noise variance values for each of a plurality of pixels by applying a Fast Fourier Transform to the received scan data; and
determining the at least one of regularization parameters and potential functions from the noise variance values of each of the plurality of pixels.

11. A method in accordance with claim 10 wherein the noise variance values for each of the plurality of pixels are further based on calibration data, the calibration data comprising one of x-ray source intensity fluctuations from a reference channel and a measured magnetic resonance (MR) field map.

12. A method in accordance with claim 10 wherein the regularization parameters are described by:

$$\delta_{jk} = 3\sqrt{\sigma_j \sigma_k},$$

wherein $\sigma_j^2$ and $\sigma_k^2$ are variance estimates a respective pixel.

13. A method in accordance with claim 10 wherein the variance of each of the plurality of pixels is described by:

$$\sigma_j^2 \approx \int_0^{2\pi} \int_0^{\infty} \frac{w_1^j(\phi)/|\rho|}{|w_0^j(\phi)/|\rho|+R(\rho,\phi)|^2} |\rho|d\rho d\phi,$$

wherein $\rho$ and $\phi$ are variables in polar coordinates, $w^j(\phi)$ is an angular-dependent weighting function that depends on the received scan data that intersect the jth pixel, and $R(\rho,\phi)$ is a local frequency response of a regularization term.

14. A method in accordance with claim 1 further comprising determining the at least one of regularization parameters and potential functions for filtering an image during post-processing.

15. A method in accordance with claim 1 wherein determining at least one of regularization parameters and potential functions for a plurality of portions of an image for reconstructing the image is performed iteratively for at least one of the plurality of portions of the image based on feedback.

16. A method in accordance with claim 15 wherein the feedback includes a user input.

17. A method in accordance with claim 1 wherein, when potential functions are determined based on the received scan data, the method further comprises determining a different potential function for every pair of neighboring portions of the image.

18. A method in accordance with claim 1 wherein the scan data from which the at least one of regularization parameters and potential functions is determined comprises one of sinogram data, projection data, or k-space data.

19. A method for controlling image reconstruction in an imaging system, said method comprising:
receiving scan data;
selecting an edge preserving regularization method;
determining, based on the received scan data, at least one of regularization parameters and potential functions for a plurality of portions of an image to be reconstructed, wherein the at least one of regularization parameters and potential functions vary for the plurality of portions of the image;
inputting the determined at least one of regularization parameters and potential functions into the edge preserving regularization equation to determine a regularlization term;
forming a cost function based on a data fit term and the regularlization term;
minimizing the cost function using an iterative algorithm; and
subsequently reconstructing the image based on the received scan data and a minimized value of the cost function.

20. An imaging system comprising:
a data acquisition portion for acquiring scan data; and
a processing portion configured to determine, based on the acquired scan data, at least one of regularization parameters and potential functions for a plurality of portions of an image to be reconstructed, wherein the at least one of regularization parameters and potential functions vary for the plurality of portions of the image;
wherein the at least one of regularization parameters and potential functions is determined from the acquired scan data absent any image reconstruction of the acquired scan data being performed by the processing portion.

21. A method for controlling image reconstruction in an imaging system, said method comprising:
receiving scan data; and
determining, with user input and based on the received scan data, at least one of regularization parameters and potential functions for a plurality of portions of an image to be reconstructed, wherein the at least one of regularization parameters and potential functions vary for the plurality of portions of the image;
wherein the user input comprises a scan protocol for a specified anatomical region; and
wherein the at least one of regularization parameters and potential functions is determined from the user input and the received scan data prior to any image reconstruction of the acquired scan data being performed by the processing portion.

22. A method in accordance with claim 21 wherein said determining at least one of regularization parameters and potential functions comprises determining the at least one of regularization parameters and potential functions using scan data from other temporal information.

* * * * *